(12) United States Patent
Froelich et al.

(10) Patent No.: US 6,178,197 B1
(45) Date of Patent: *Jan. 23, 2001

(54) FREQUENCY DISCRIMINATION IN A SPREAD SPECTRUM SIGNAL PROCESSING SYSTEM

(75) Inventors: Robert K. Froelich, Sunnyvale; Forrest Fulton, Los Altos Hills, both of CA (US)

(73) Assignee: CellNet Data Systems, Inc., San Carlos, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/365,108

(22) Filed: Jul. 30, 1999

Related U.S. Application Data

(63) Continuation of application No. 08/880,634, filed on Jun. 23, 1997, now Pat. No. 6,047,016, which is a continuation of application No. 08/880,470, filed on Jun. 23, 1997, which is a continuation of application No. 08/881,549, filed on Jun. 23, 1997, which is a continuation of application No. 08/880,637, filed on Jun. 23, 1997, which is a continuation of application No. 08/880,578, filed on Jun. 23, 1997.

(51) Int. Cl.[7] .................................................. H04K 1/00
(52) U.S. Cl. ........................... 375/150; 375/326; 375/343
(58) Field of Search ..................................... 375/326, 150, 375/147, 343

(56) References Cited

U.S. PATENT DOCUMENTS

| | | | |
|---|---|---|---|
| 4,225,935 | 9/1980 | Zscheile, Jr. et al. | 708/253 |
| 4,295,204 | 10/1981 | Sunstein | 708/818 |
| 4,320,513 | 3/1982 | Lampert | 370/342 |
| 4,465,153 | 8/1984 | van de Pas et al. | 380/47 |
| 4,477,912 | 10/1984 | Russell | 375/367 |
| 4,567,588 | 1/1986 | Jerrim | 375/150 |
| 4,621,365 | * 11/1986 | Chiu | 375/150 |
| 4,707,839 | 11/1987 | Andren et al. | 375/150 |
| 4,730,340 | 3/1988 | Frazier, Jr. | 375/150 |
| 4,761,795 | 8/1988 | Beier | 375/149 |
| 4,785,463 | 11/1988 | Janc et al. | 375/147 |
| 4,817,014 | 3/1989 | Schneider et al. | 375/343 |
| 4,841,544 | 6/1989 | Nuytkens | 375/150 |
| 4,903,225 | 2/1990 | Brost | 375/343 |
| 5,023,887 | 6/1991 | Takeuchi et al. | 375/130 |
| 5,031,192 | 7/1991 | Clark | 375/130 |
| 5,146,471 | 9/1992 | Cowart | 375/142 |
| 5,157,686 | 10/1992 | Omura et al. | 375/146 |
| 5,166,952 | 11/1992 | Omura et al. | 375/149 |
| 5,214,669 | 5/1993 | Zarembowitch | 375/130 |
| 5,216,696 | 6/1993 | Poklemba | 375/346 |

(List continued on next page.)

FOREIGN PATENT DOCUMENTS 9-135150   5/1997   (JP).

OTHER PUBLICATIONS

H. Lan et al., Rapid Acquisition Schemes for CDMA Systems in a Multipath Delay and Delay and Fading Environment, IEEE, pp. 593–597, May 1994.

(List continued on next page.)

Primary Examiner—Tesfaldet Bocure
(74) Attorney, Agent, or Firm—Fish & Richardson P.C.

(57) ABSTRACT

The actual carrier frequency of a spread spectrum signal is found by tuning a pair of correlators to a pair of search frequencies and then correlating the spread spectrum signal against one or more reference signals to produce a pair of correlation magnitude values. The ratio of the difference between the correlation magnitude values to the sum of the correlation magnitude values determines the offset between the actual carrier frequency and an estimated carrier frequency.

32 Claims, 13 Drawing Sheets

U.S. PATENT DOCUMENTS

| | | | |
|---|---|---|---|
| 5,253,268 | 10/1993 | Omura et al. .................... | 375/150 |
| 5,276,706 | 1/1994 | Critchlow ......................... | 375/343 |
| 5,291,517 | 3/1994 | Stein et al. ....................... | 375/142 |
| 5,303,257 | 4/1994 | Stein et al. ....................... | 375/142 |
| 5,305,349 | 4/1994 | Dent .................................. | 370/209 |
| 5,377,232 | 12/1994 | Davidov et al. .................. | 375/354 |
| 5,383,220 | 1/1995 | Murai ................................ | 375/150 |
| 5,414,729 | 5/1995 | Fenton .............................. | 375/149 |
| 5,414,730 | 5/1995 | Lundquist et al. ............... | 375/150 |
| 5,422,909 | 6/1995 | Love et al. ........................ | 375/147 |
| 5,440,597 | 8/1995 | Chung et al. ..................... | 375/149 |
| 5,479,442 | 12/1995 | Yamamoto ........................ | 375/150 |
| 5,511,090 | 4/1996 | Denton et al. .................... | 375/142 |
| 5,521,938 | 5/1996 | Stewart et al. .................... | 375/146 |
| 5,528,624 | 6/1996 | Kaku et al. ....................... | 375/148 |
| 5,574,721 | 11/1996 | Magill ............................... | 375/149 |
| 5,577,025 | 11/1996 | Skinner et al. .................... | 375/149 |
| 5,577,066 | 11/1996 | Schuchman et al. ............. | 375/222 |
| 5,596,601 | 1/1997 | Bar-David ......................... | 375/143 |
| 5,612,972 | 3/1997 | Fukushi et al. ................... | 375/149 |
| 5,623,511 | 4/1997 | Bar-David et al. ............... | 375/143 |
| 5,638,362 | 6/1997 | Dohi et al. ........................ | 370/342 |
| 5,640,416 | 6/1997 | Chalmers .......................... | 375/147 |
| 5,691,974 | 11/1997 | Zehavi et al. ..................... | 375/326 |
| 5,719,899 | 2/1998 | Thielecke et al. ................ | 375/144 |
| 5,754,584 | 5/1998 | Durrant et al. .................... | 375/142 |
| 5,787,125 | 7/1998 | Mittel ................................ | 375/329 |
| 5,796,776 | 8/1998 | Lomp et al. ....................... | 375/140 |
| 5,805,584 | 9/1998 | Kingston et al. .................. | 375/145 |
| 5,805,648 | 9/1998 | Sutton ............................... | 375/367 |
| 5,862,139 | 1/1999 | Yanagi ............................... | 370/441 |
| 6,047,017 | 4/2000 | Cahn et al. ........................ | 375/150 |

OTHER PUBLICATIONS

J. Simsa et al., "Comparison of Multiple–Dwell Code Acquisition Detector Rules in DS–SS Serial Search by Envelope Correlator", IEEE, pp. 614–618, May 1994.

J.J. Freeman, "The Action of Dither in a Polarity Coincidence Correlator," IEEE Transactions on Communications pp. 857–861, Jun. 1974.

C.R. Cahn, "Performance of Digital Matched Filter Corrrelator with Unknown Interference", IEEE Transactions on Communication Technology, pp. 1163–1171, Dec. 1971.

F. Amoroso, "Performance of the Adaptive A/D Converter in combined CW and Gaussian Interference," IEEE, 539–558, Mar. 1984.

J. L., Bricker, "Mathematical Methodology for Analysis of the Adaptive A/D Converter in Combined CW and Gaussian Interference", IEEE, pp. 545–551, 1984.

R. Kuc, "Introduction to Digital Signal Processing," McGraw–Hill, Inc. pp. 139–142, 1988.

K. V. Cai, "Optimization of 2–Bit A/D Adaptive Converter Performance in CW Interference,"IEEE, pp. 552–558, 1984.

I. Okazaki et al., "Spread Spectrum Pulse Position Modulation–A Simple Approach for Shannon's Limit", IEICE Trans. Commun., vol. E76–8, No. 8, Aug. 1993.

John D. Endsley, "Multi–Access Properties of Transform Domain Spread Spectrum Systems", Department of Defense, Milcon 1993, p. 505.

* cited by examiner

| Chip # | Symbol Phase |
|---|---|
| 0 | Symbol 0 |
| 1 | |
| 2 | Symbol 1 |
| 3 | |
| 4 | Symbol 2 |
| 5 | |
| 6 | Symbol 3 |
| 7 | |
| 8 | Symbol 4 |
| 9 | |
| 10 | Symbol 5 |
| 11 | |
| 12 | Symbol 6 |
| 13 | |
| 14 | Symbol 7 |
| 15 | |
| 16 | Symbol 8 |
| 17 | |
| 18 | Symbol 9 |
| 19 | |
| 20 | Symbol 10 |
| 21 | |
| 22 | Symbol 11 |
| 23 | |
| 24 | Symbol 12 |
| 25 | |
| 26 | Symbol 13 |
| 27 | |
| 28 | Symbol 14 |
| 29 | |
| 30 | Symbol 15 |
| 31 | |
| 62 | |

*FIG. 4*

FREQUENCY DISCRIMINATION IN A SPREAD SPECTRUM SIGNAL PROCESSING SYSTEM

RELATED APPLICATIONS

This application is continuation of U.S. applications Ser. No. 08/880,634, filed Jun. 23, 1997, entitled "Processing a Spread Spectrum Signal in a Frequency Adjustable System" now issued as U.S. Pat. No. 6,047,016 on Apr. 4, 2000; Ser. No. 08/880,470, filed Jun. 23, 1997, entitled "Bandpass Processing of a Spread Spectrum Signal"; Ser. No. 08/881, 549, filed Jun. 23, 1997, entitled "Acquiring a Spread Spectrum Signal"; Ser. No. 08/880,637, filed Jun. 23, 1997; entitled "Receiving a Spread Spectrum Signal"; and Ser. No. 08/880,578, filed Jun. 23, 1997, entitled "Bandpass Correlation of a Spread Spectrum Signal," all of which are incorporated by reference into this application.

BACKGROUND

The invention relates to processing a spread spectrum signal.

In wireless systems, information typically is transmitted by modulating the information onto carrier waves having frequencies that lie within preassigned frequency bands. Radio frequency (RF) receivers demodulate the carrier waves to recover the transmitted information.

Spread spectrum communication systems spread transmitted signals over bandwidths much larger than those actually required to transmit the information. Spreading a signal over a wide spectrum has several advantages, including reducing the effects of narrow band noise on the signal and, in many situations, providing increased protection against interception by unwanted third parties. In a direct sequence spread spectrum (DSSS) system, the bandwidth of a transmitted signal is increased by modulating the signal onto a known pseudo-noise (PN) signal before modulating onto the carrier wave. The PN signal typically is a digital signal having an approximately equal number of high and low bits (or "chips"), which maximizes the spectrum over which the signal is spread. A typical implementation of a DSSS receiver recovers the transmitted information by demodulating the carrier wave and then multiplying the resulting signal with a local replica of the PN signal to eliminate the PN signal. The DSSS technique offers heightened security because the receiver must know the PN sequence used in the transmission to recover the transmitted information efficiently. Other spread spectrum techniques include frequency hopped spread spectrum (FHSS).

A DSSS receiver must be tuned to the carrier frequency of the signal to be received. In many systems (e.g., GPS and CDMA cellular telephony) the received signal is continuous or of long duration, so that it is practical for the receiver to use narrow-bandwidth phase-lock techniques to track the carrier frequency of the incoming signal. But in a data collection system, such as might be used for wireless meter reading, the incoming signal is typically a short packet whose carrier frequency is subject to considerable uncertainty due to the low cost and simplicity of the transmitter. In such a case, phase-lock techniques become difficult, and the wider bandwidths required for fast acquisition render them less advantageous due to increased noise.

Receivers in a short-packet system where phase-lock techniques are impractical and where frequency tracking is required must somehow measure the frequency of the incoming signal and gain the information needed to tune onto the carrier frequency. Typically, such receivers use a frequency discriminator to measure the carrier frequency of the incoming signal. Commonly-used analog discriminator techniques include delay lines and stagger-tune detectors, while digital techniques include dual differentiators and arctangent algorithms. However, if a system is otherwise designed only to measure and report the magnitude response to DSSS signals of a particular code phase and frequency, each of these frequency measurement techniques requires the addition of system hardware that is dedicated to the task of frequency discrimination.

SUMMARY

The invention provides a way to simplify and reduce the cost of frequency discrimination by using hardware already incorporated in a wireless system for other purposes. For example, the same correlators used to recover modulated data from a spread spectrum signal can be used to determine the signal's carrier frequency relatively precisely, e.g., to within 2 kHz, from a large interval (e.g., 30 kHz) of frequency uncertainty. Only a few correlators covering narrow frequency intervals are needed to discriminate the carrier frequency this precisely. Calculating the carrier frequency in this manner is quicker and easier than traditional frequency determination techniques, including the "dual differentiator" technique., which requires the differentiation and cross-multiplication of in-phase and quadrature signals, and the "arctangent technique," which requires the computation and subsequent differentiation of the tangent of the phase angle implied by the in-phase and quadrature components of the spread spectrum signal. The invention can be implemented with simple, inexpensive hardware components that are realized in a variety of technologies such as application-specific integrated circuit (ASIC) technology, or with a relatively simple set of instructions for use in a microprocessor or microcontroller.

In some aspects, the invention involves determining an actual carrier frequency of a spread spectrum signal. A pair of correlators is tuned to a pair of search frequencies and then used to correlate the spread spectrum signal against one or more reference signals to produce a pair of correlation magnitude values. The ratio of the difference between the correlation magnitude values to the sum of the correlation magnitude values determines the offset between the actual carrier frequency and an estimated carrier frequency.

In some embodiments, one of the search frequencies is greater than the estimated carrier frequency and the other search frequency is less than the estimated carrier frequency. In other embodiments, both of the search frequencies are greater than the estimated carrier frequency. In still other embodiments, both of the search frequencies are less than the estimated carrier frequency.

Some embodiments involve correlating the spread spectrum signal against the reference signal over multiple correlation periods to produce multiple correlation magnitude values for each correlator. For each correlation period, the difference and the sum of correlation magnitude values for the pair of correlators is calculated. In some cases, the ratio of the difference to the sum of the correlation magnitude values is calculated for the pair of correlators during each correlation period.

Other embodiments involve tuning at least one additional correlator to another search frequency and correlating the spread spectrum signal against the reference signal to produce at least one additional correlation magnitude value. In many cases, the search frequencies are evenly spaced. The ratio is determined using the difference and the sum of correlation magnitude values for a chosen pair of the correlators tuned to adjacent search frequencies. The offset is proportional to the ratio and includes a constant determined by which pair of the correlators is chosen. In some cases, a cumulative total of correlation magnitude values is calculated for each pair of correlators tuned to adjacent search frequencies. The chosen pair of correlators often includes the correlators that produce the highest cumulative total of correlation magnitude values. The estimated carrier frequency often is equidistant from the highest and lowest search frequencies.

Other embodiments and advantages will become apparent from the following description and from the claims.

BRIEF DESCRIPTION OF THE DRAWINGS

The accompanying drawings, which are incorporated in and constitute a part of the specification, illustrate embodiments of the invention and, together with the general description above and the detailed description below, serve to explain the principles and advantages of the invention.

FIG. 4 is chart showing the code phases of a possible 16-CCSK alphabet generated from a 63-chip PN sequence.

DETAILED DESCRIPTION

Figure 1:
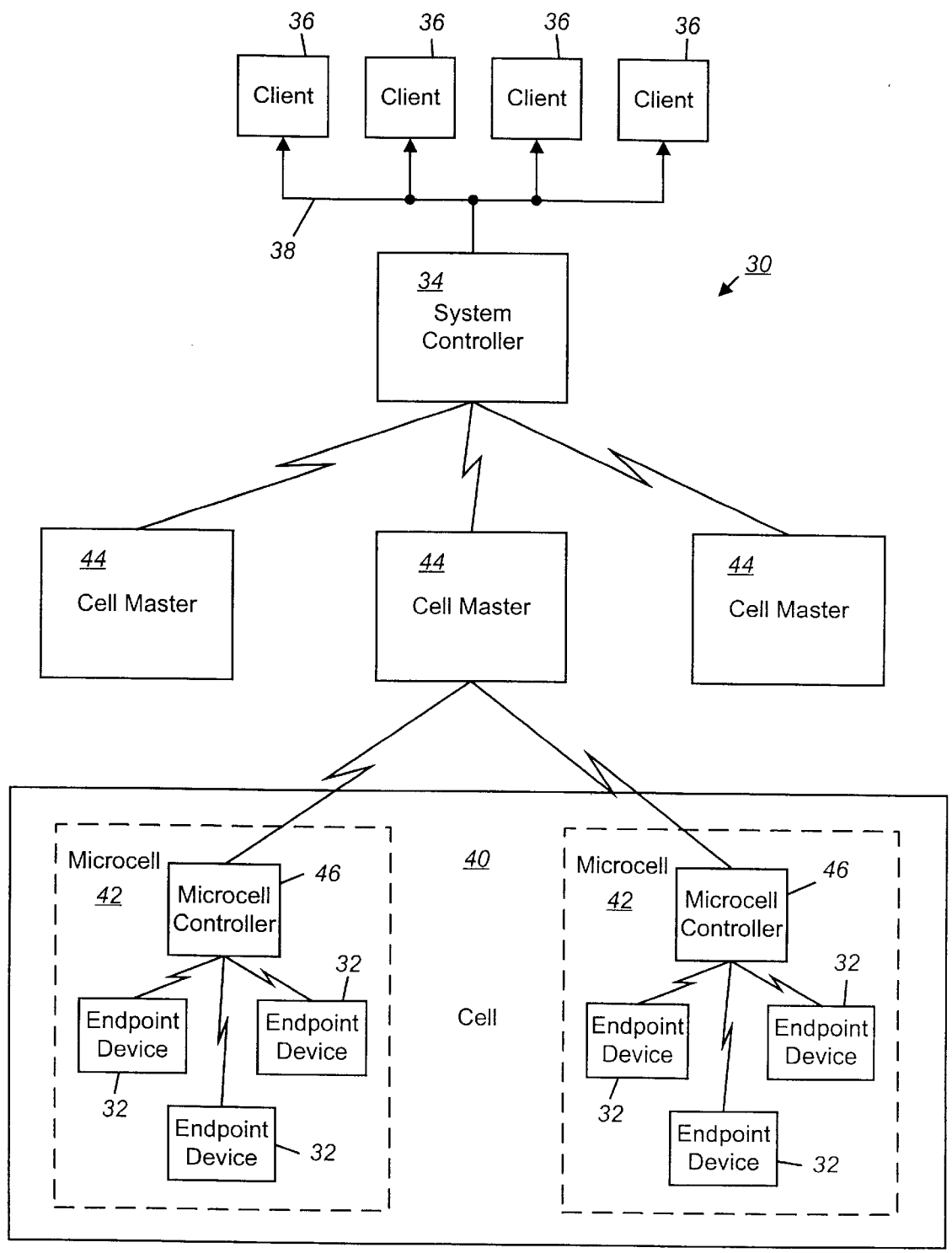
FIG. 1 is a block diagram of a wireless local area network (LAN).

Referring to FIG. 1, spread spectrum technology is particularly suited for use in a wireless network 30 in which many devices (e.g., radios) transmit different streams of information within a relatively small geographic area. The wireless network 30 may be used in remote monitoring applications, e.g., by large utility companies to monitor resource consumption remotely. A network 30 used in such a manner typically consists of a large number of endpoint devices 32, such as devices that record resource consumption at utility meters (e.g., electricity meters) located at business and residential structures throughout a metropolitan area. The endpoint devices 32 gather information and, using internal wireless radio transceivers (not shown in the figure), periodically transmit the information as digital data packets through a hierarchical network to a system controller 34. System controller 34 typically includes a network server computer (not shown in the figure) that may distribute the information to clients 36 on a computer network 38. In larger metropolitan areas, endpoint devices 32 in the wireless network 30 may be organized into "cells" 40, which may be divided into "microcells" 42. Typically, microcells 42 cover relatively small geographic areas of similar size or containing a similar number of endpoint devices 32. Each cell 40 is governed by a cell master 44, which relays information between the system controller 34 and the endpoint devices 32 in the cell 40. Likewise, each microcell 42 is governed by a microcell controller 46, which supervises the operation of all endpoint devices 32 in the microcell 42 and which relays information to the corresponding cell master 44 from the endpoint devices 32 in the microcell 42.

The wireless network 30 should include as few microcell controllers 46 as possible since each controller 46 adds to the total cost of installing and administering the network 30. The number of microcell controllers 46 required in a given geographical area depends upon the minimum signal strength ("sensitivity") at which each controller 46 can recover information contained in transmissions from the endpoint devices 32 in the corresponding microcell 42. The cost of the wireless network 30 may be reduced and its dynamic capabilities may be expanded if the wireless radios used in the communicating devices (e.g., system controller 34, cell masters 44, microcell controllers 46, and endpoint devices 32) in the network 30 were to include more efficient components than those currently available.

The invention is suited for use in a wireless network such as that shown in FIG. 1 and in direct sequence spread spectrum (DSSS) systems in which cyclic code shift keying (CCSK) is used to modulate digital data onto digital pseudonoise (PN) spreading sequences. CCSK is a modulation technique in which circular phase shifts of a PN sequence are used to represent the possible constellation (or data) symbols. For example, a 63-chip PN sequence could support up to 63 different data symbols, each of which would be 63-chips in length. An M-CCSK constellation (or alphabet) is a group of M CCSK data symbols, each representing a unique combination of binary data bits, where M is an integer greater than one. Spread spectrum communication systems using CCSK and related data modulation techniques are described in U.S. Pat. No. 4,707,839, issued to Andren et al., on Nov. 17, 1987, and U.S. Pat. No. 4,730,340, issued to Frazier, Jr., et. al, on Mar. 8, 1988, both of which are incorporated by reference in this disclosure. The invention will be described in the context of a DSSS system using CCSK data modulation, but the invention is not limited to use in such a system.

Figure 2:
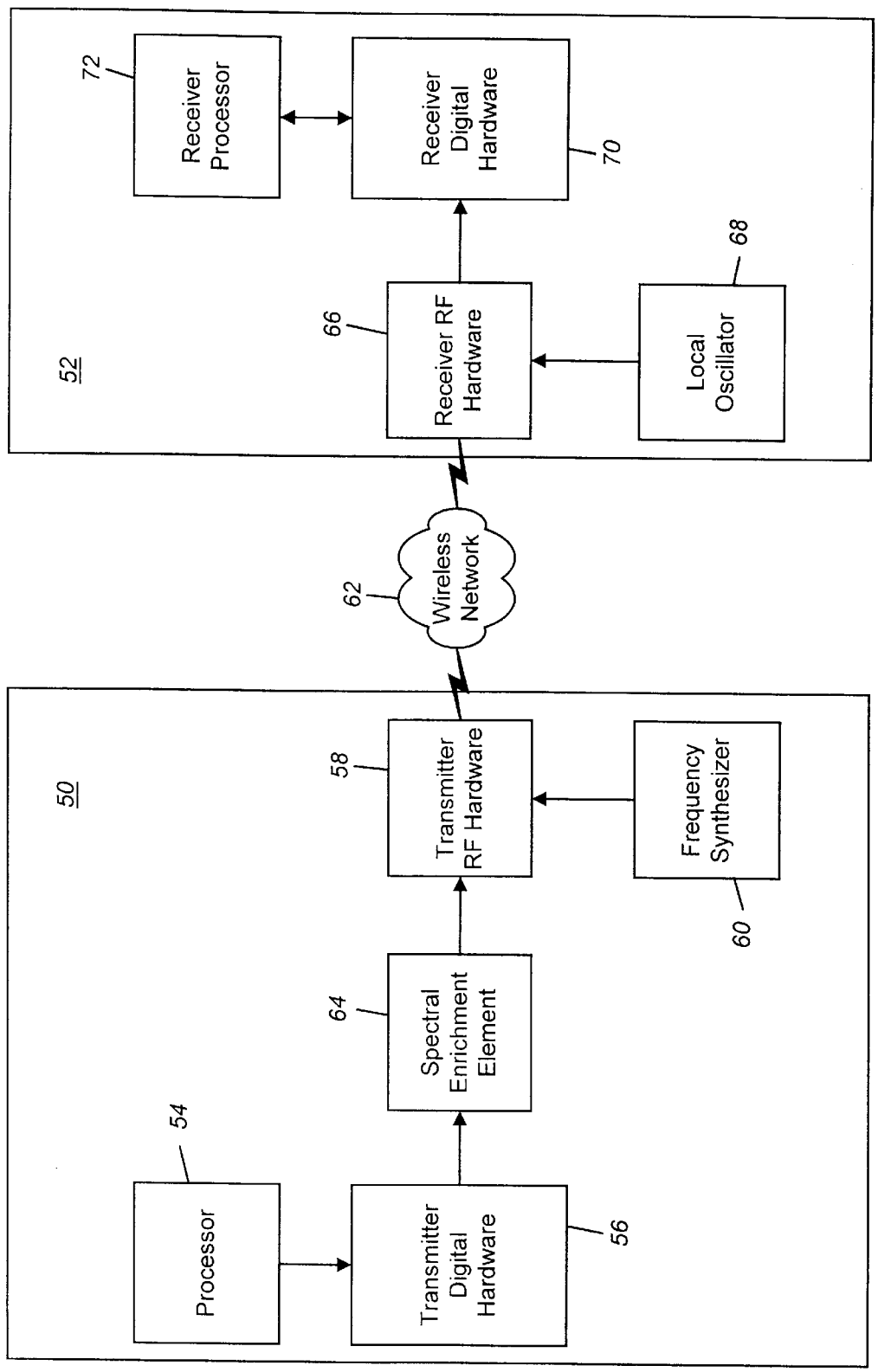
FIG. 2 is a block diagram of a transceiver for use in a wireless network such as that shown in FIG. 1.

Referring also to FIG. 2, at least some of the radios in the system controller 34, cell masters 44, microcell controllers 46, and endpoint devices 32 of the DSSS wireless network 30 of FIG. 1 include a transmitter 50 and a receiver 52 equipped to send and receive, respectively, spread spectrum signals carrying information encoded onto a PN sequence with CCSK modulation. In the transmitter 50, data to be transmitted is generated by a computing device, such as a microprocessor 54. A digital hardware block 56 receives the data, along with instructions for processing it, from the processor 54 and modulates the data onto a predetermined PN sequence to form a spread spectrum signal. An RF hardware block 58 then modulates the spread spectrum signal onto an RF carrier wave (e.g., a wave in the ISM band ranging from 902 MHZ to 928 MHZ), the frequency of which is determined by frequency synthesizer 60, and transmits the combined signal over a wireless transmission channel 62. The transmitter 50 also may include a spectral enrichment block 64, which further improves the transmitter's spreading qualities by modulating an additional PN sequence over the CCSK modulated primary PN sequence, as discussed below.

The transmitted RF signal is received by the receiver 52 and may be down converted to an intermediate frequency (IF) by an RF hardware block 66 controlled by a local oscillator (LO) 68. The intermediate frequency is selected according to the following equation:

$$IF=F_s \cdot (N \pm \frac{1}{4}),$$

where $F_s$ is the sampling rate of an A/D converter (discussed below) and N is an integer. A digital hardware block 70 in the receiver 52 samples the IF signal and converts the samples to digital representation. The digital hardware block 70 then demodulates the spread spectrum signal to recover the encoded digital data. A processor 72 in the receiver controls the operation of the digital hardware block 70 and uses the recovered data as specified by firmware and software associated with the processor 72. Within each device in the wireless network 30, a single processor may be used to control both the transmitter 50 and the receiver 52.

The primary PN sequence (or "code") used to create the spread spectrum signal consists of a predetermined number of repeating binary code bits (or "chips"), approximately half of which have a binary value of "1" and the rest of which have a binary value of "−1". Evenly distributing the number of high and low chips in this manner maximizes the spreading quality of the PN code. During a single code period of the PN sequence, the chips in the sequence are generated one time in succession. The transmitter's digital hardware block 56 modulates digital data from the processor 54 onto the primary PN code by adjusting the starting point of the PN sequence at the beginning of each code period, as discussed below. By adjusting the starting point of the PN code, the digital hardware block 56 creates "code phase shifts" in the code, each of which represents a different data "symbol" identifying a unique combination of data from the processor. The maximum number of data bits identified by each data symbol depends on the length of the PN code and the size of the code phase shifts separating the data symbols. Since data symbols typically should be separated by phase shifts of at least two chips to allow adequate reception, a PN code comprising $2^M$ chips may support an alphabet of $2^{M-1}$ symbols encoding M-1 bits of digital data. For example, a 64-chip PN code (M=6) may support up to 32 ($2^5$) symbols that encode up to 5 bits of binary data. In this manner, CCSK modulation allows for the transmission of several bits of digital data for each period of the spreading sequence, which reduces the duration of transmitted packets and which, in turn, improves the efficiency of devices in the wireless network.

Figure 3:
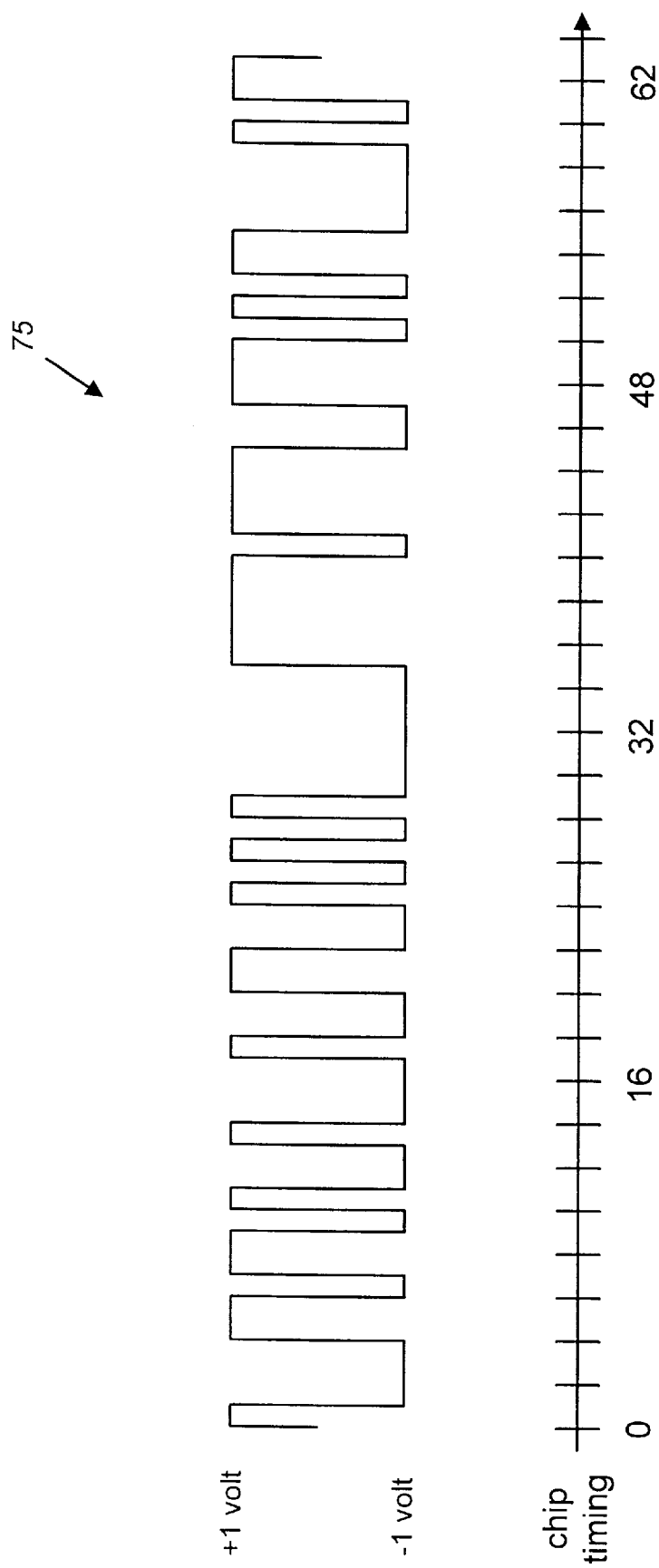
FIG. 3 is waveform illustrating one period of a 63-chip PN sequence.

Referring to FIG. 3, a suitable PN code may be generated with standard electronic components. One such code is the 63-chip code 75 of FIG. 3, which represents one of the maximal length sequences that may be generated using a standard 6-bit feedback shift register. The 63-chip sequence 75 ideally is generated at a code frequency of approximately 19.2 kHz, so each code period of the sequence has a total duration of approximately 52 μsec. Therefore, each chip has a duration of approximately 825 nsec, and the chip rate is approximately 1.2 Mchip/sec. Multiplying the RF carrier wave by this spreading sequence converts the carrier spectrum from an impulse at the carrier frequency in the ISM band to a sin(x)/x (sinc function) shape, where the first nulls of the sinc function are offset by approximately ±1.2 MHZ from the carrier frequency. The fine structure of the spread spectrum carrier includes spectral lines at a spacing of approximately 19.2 kHz.

Referring also to FIG. 4, four bits of digital data may be modulated onto the 63-chip PN code 75 for each code period. Since four digital bits may take on sixteen different values, the four bits are represented by sixteen different code phases of the PN code, each formed by starting the PN code at a corresponding one of the sixty-three chips ("16-CCSK" modulation). While any allocation of code phases at least two chips apart may be used to generate a sixteen symbol alphabet, one simple alphabet includes a first symbol ("symbol 0") that begins with the first chip ("chip 0") of the PN code 75 and fifteen other symbols ("symbol 1" through "symbol 15") that each begin exactly two chips behind the preceding symbol. Since one symbol is transmitted for every period of the PN code, the data symbol rate equals the code frequency (19.2 kHz), and the digital data transmission rate is four times the code frequency (76.8 kbits/sec).

To recover 16-CCSK modulated data, a receiver must determine which of the sixteen PN code phases was used in the spreading process. The receiver 52 of FIG. 2 accomplishes this by correlating, in parallel, the received signal against sixteen locally generated copies of the PN sequence, where each copy has a code phase shift corresponding to one of the sixteen symbol values. At the end of each symbol period, the receiver determines the symbol value by determining which copy of the PN sequence produced a correlation peak. The symbol phases should be separated by at least two chips to minimize errors by avoiding correlation overlap. The data recovery process, including signal correlation, is described in more detail below.

As mentioned above, each transmitter may include a spectral enrichment block that further improves the spreading qualities of the transmitter. Spectral enrichment superimposes a relatively slow, repeating binary sequence, also having logic levels of ±1, on top of the primary PN sequence. The enrichment sequence may be, e.g., a 15-chip sequence that has a chip rate equal to one-half of the symbol rate (e.g., approximately 9600 Hz). Therefore, each chip in the enrichment sequence covers two periods of the primary PN sequence, and the sequence changes values only at symbol boundaries. Modulating the spectral enrichment signal over the modulated PN sequence can allow the transmitter to operate at higher power levels without violating FCC power regulations. Spectral enrichment is described in more detail in U.S. Pat. No. 5,661,750, issued Aug. 26, 1997, and entitled "Direct Sequence Spread Spectrum System."

Figure 5:
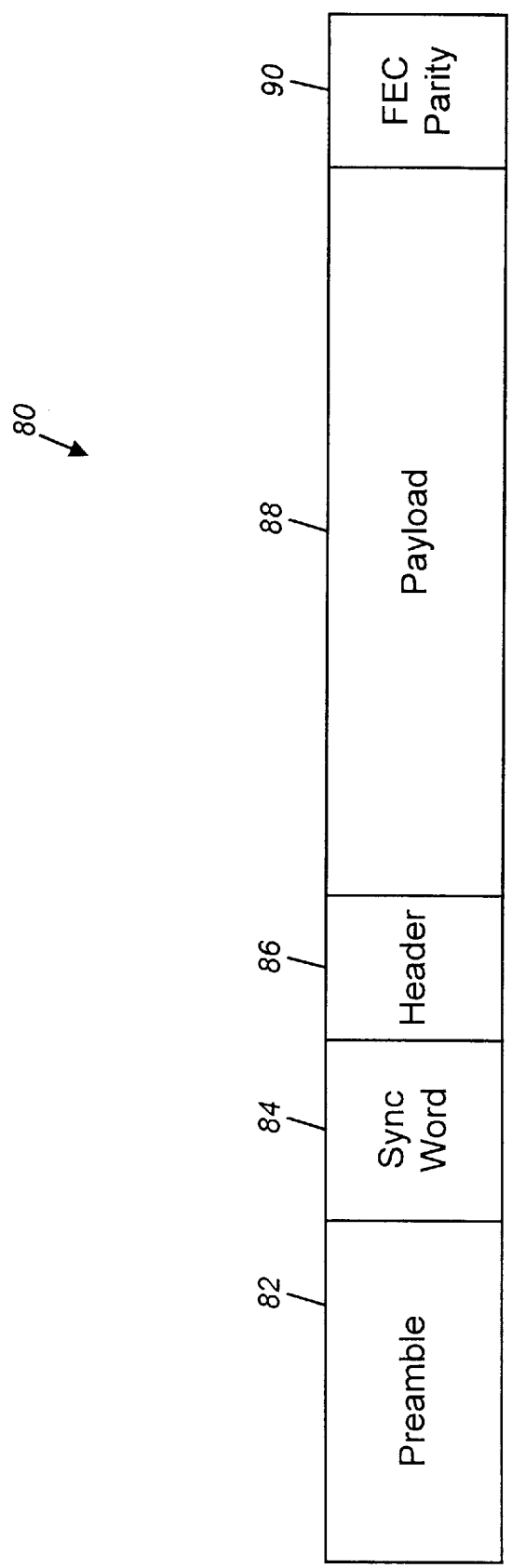
FIG. 5 is a diagram showing the components of an information packet transmitted in a spread spectrum communication system using CCSK modulation.

Referring now to FIG. 5, each packet 80 transmitted between the system controller 34 and one of the endpoint devices 32 in the wireless network 30 of FIG. 1 should have a known structure to ensure that it will be recognized and properly decoded by the intended recipient device. Therefore, each packet 80 will include a preamble 82 consisting of multiple repetitions of the primary PN sequence. The preamble 82 allows the receiver to recognize that a packet has been sent and to synchronize to the phase of the PN sequence used in generating the packet (i.e., the "transmission phase"). Increasing the length of the preamble increases the chances of accurately detecting each packet, but also increases the total duration of each packet and therefore decreases the overall efficiency of the network. Once detected, the incoming PN transmission phase serves as a reference phase for all subsequent data demodulation, as described in more detail below.

Following the preamble 82 is a 2-CCSK synchronization ("sync") word 84, which consists of multiple known symbols (each carrying one bit of binary data) that indicate to the receiver that data delivery is about to begin. The sync word 84 also allows the receiver to discard most erroneous packets not otherwise detected. Encoding the sync word 84 as 2-CCSK provides a slight gain in sensitivity over the 16-CCSK modulation used to encode the digital data that follows. The sync word 84 may consist of a Barker code encoded using the first two code phases ("symbol 0" and "symbol 1") of the sixteen symbol alphabet described above.

Following the sync word 84 is a header 86 of known length that contains an address field indicating the address of the source of the packet. The address field also may indicate the address of the intended recipient of the packet. The header 86 also includes a length field indicating the length of the data payload to follow. The header 86 also may contain control bits.

Following the header is the data payload portion 88 of the packet 80, which may include up to 255 symbols of 16-CCSK modulated data per byte in the length field of the header. Following the data payload portion 88 is FEC parity information 90 for use in detecting and correcting packet corruption.

Figure 6:
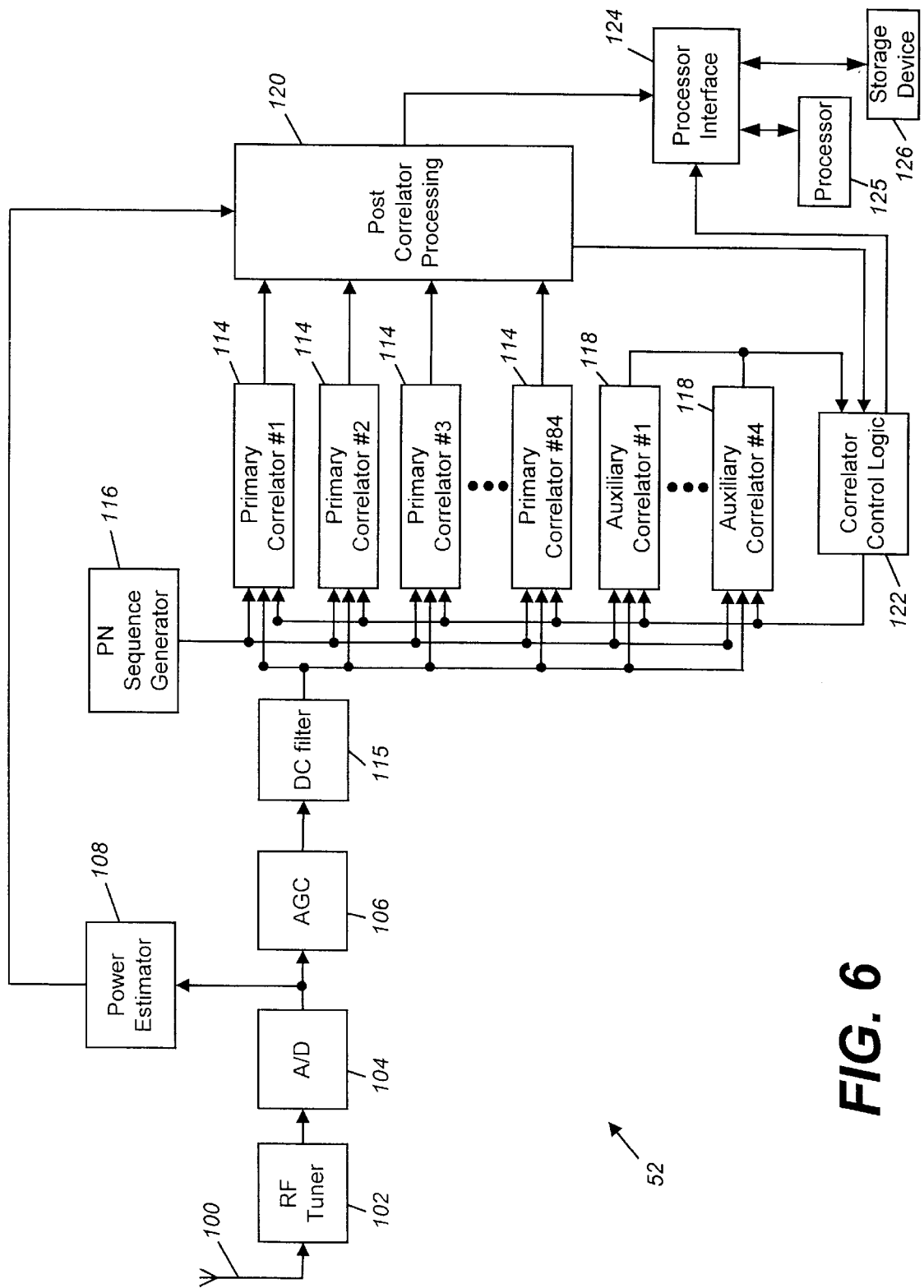
FIG. 6 is a block diagram of a receiver for use in a spread spectrum communication system.

Referring now to FIG. 6, the receiver 52 includes an antenna 100 coupled to a standard RF tuner 102, which down converts the received signal from the RF carrier to the IF carrier and adjusts the power level of the signal, if necessary, to ensure that it falls within a range suitable for analog-to-digital (A/D) conversion. The down converted analog signal then is provided to an A/D converter 104, which samples the signal at a sampling rate ($F_s$) eight times the chip rate of the PN spreading sequence. In other words, for a 63-bit PN sequence having a chip rate of 1.2 MHZ, the A/D converter 104 samples the incoming signal at a rate of approximately 9.6 MHZ, or eight samples per chip (8x over sampling). The A/D converter 104 performs a "fixed conversion" which allows the A/D converter 104 to output the sampled spread spectrum signal at a second intermediate carrier frequency lower than the sampling rate. Ideally, the second IF carrier frequency equals approximately one-quarter the sampling frequency ($F_s/4$). Converting the incoming digital signal to $F_s/4$ provides several advantages, such as: (1) allowing the use of an AC-coupled filter 115 (or "DC block") to eliminate DC offset introduced by the RF tuner 102, the A/D converter 104, and the AGC circuit 106; (2) allowing the use of implementation efficient bandpass correlators, as described below; and (3) allowing extraction of the in-phase and quadrature components through a de-interleaving process. The digital tuner 110 may down convert the digital signal to any other fractional frequency of the sampling frequency, provided that the upper end of the digital signal's bandwidth remains below $F_s/2$ and the lower end of the bandwidth remains high enough to allow the AC-coupled filter 115 to remove unwanted DC offset. The A/D converter 104 provides its digital output to an automatic gain control (AGC) circuit 106, which keeps the amplitude of the digital signal within an appropriate range, and to a power estimation block 108, which calculates the total energy of the digital signal. The output of the power estimation block 108 is used by the receiver 52 to evaluate whether a packet has been received, as discussed below, and to provide information to an AGC algorithm performed by the processor.

The digital signal, centered at $F_s/4$, is provided to a bank of eighty-four primary correlators 114, some of which are used in each of the three stages (or "modes") of the receiver's operation: search/qualification, acquisition, and demodulation. Each of the primary correlators 114 compares the incoming digital signal against a particular code phase of the PN sequence, a copy of which is provided to the primary correlator 114 by a PN sequence generator 116. As described in more detail below, the primary correlator 114 correlates the incoming signal with the copy by multiplying the two signals to form a product signal. If the code phases are aligned, the product signal is a DC signal having a value of "1". Each primary correlator 114 integrates its product signal over the symbol period to form a correlation output, which generally will have a high magnitude relative to noise if the signals are aligned and a low magnitude relative to noise otherwise. An implementation efficient bandpass correlator structure is described in detail below.

The digital signal, centered at $F_s/4$, also is provided to four auxiliary correlators 118, which are used to verify potential signal detections ("trips") produced during the search/qualification mode, and to fine-tune the receiver to the frequency of the incoming signal during the acquisition mode. Each of the auxiliary correlators 118 receives a copy of the PN sequence at separate ones of the possible code phases and is individually tunable over the desired frequency range discussed below. The auxiliary correlators 118 may use the implementation efficient bandpass correlator structure described below.

A post-correlator processing block 120 continuously monitors the outputs of the primary correlators 114 and identifies correlation peaks, each of which indicates that the code phase of the PN sequence in one of the primary correlators 114 may have matched the incoming signal during a symbol period. During the search/qualification mode, the processing block 120 produces a trip signal indicating when a correlation output may indicate a signal trip. The processing block 120 also includes a series of comparators which, during the demodulation mode, rank the correlation outputs during each symbol period according to magnitude. This information is used by the processor to demodulate the incoming data.

A correlator control logic block 122 controls operation of the correlators during the three modes of operation. The control logic block 122 includes a state machine that steps through the three operation modes and digital circuitry that supplies control signals to each of the correlators 114 and 118, according to instructions from a processor 125. A processor interface 124 allows the post-correlator processing block 120 and the control logic block 122 to provide information to the processor 125 and allows the processor 125 to provide instructions to the correlator control logic block 122. The processor may be used, as described below, to calculate the actual carrier frequency of the incoming spread spectrum signal. A storage medium 126, such as a fixed disk or random access memory (RAM), stores program instructions that may be executed by the processor to carry out its functions.

During the search/qualification mode, the receiver 52 must detect and recognize potential DSSS signals existing in the wireless network. During the acquisition mode, the receiver 52 must align to the transmission phase and frequency of the incoming signal. During demodulation, the receiver 52 must determine whether it is the intended recipient of the incoming signal and, if so, accurately demodulate the digital data contained in the signal.

As discussed above, the DSSS signals transmitted in the wireless network may consist of a carrier wave in the ISM band multiplied by a 63-chip PN sequence. To acquire one of these signals during the search and qualification mode, the receiver 52 must correlate the received signal with a local copy of the PN sequence that is almost perfectly aligned with the code phase of the original PN sequence. However, at minimal detectable signal levels the receiver 52 typically cannot recognize that a signal is present until after code phase alignment has occurred. Therefore, the process of alignment must proceed by trial-and-error.

Further complicating the search process are potential errors in the carrier frequency generated by the transmitter or the receiver's tuning frequency. In a typical wireless network the potential carrier error may be greater than ±50 kHz, so the receiver may need to search over a frequency range greater than 100 kHz centered at the nominal carrier frequency. In general, the receiver can detect signals only by searching an area defined by the PN sequence length and the carrier uncertainty by trial-and-error, and it must do so within a time defined by the packet preamble, leaving enough preamble time to align itself with the transmission phase of the incoming signal.

Typically, each primary correlator 114 will respond with a maximum sensitivity loss of 4 dB to any signal within ±⅜ chip and ±5 kHz of its code phase and frequency settings. However, distortions due to noise can result in correlator responses across a wider range of frequency. The measurement of a correlator's response will be available once per symbol period, as described in more detail below. Therefore, each primary correlator 114 can search an area of ¾ chip and 10 kHz during one symbol period. To ensure that the entire 63-chip range is searched during each symbol period and that the entire code/frequency range is searched in a reasonable time, eighty-four primary correlators 114 are required [(63 chips)÷(¾ chip per correlator)=84 correlators], each tuned to one of eighty-four search phases separated by ¾ chip.

The correlator control logic block 122 automates the search process. The control logic 122 initializes each of the primary correlators 114 to a corresponding one of the eighty-four possible ¾-chip search phases of the PN sequence and to the nominal carrier frequency, as commanded by the processor. The primary correlators 114 each include frequency adjustment elements, as described below. Each primary correlator 114 correlates the corresponding search phase of the PN sequence against the incoming digital signal for a symbol period, dumps its correlation output, and immediately begins correlating again against the digital signal over the next symbol period. The search frequency of each primary correlator 114 is increased by 10 kHz at the end of each symbol period until it reaches the upper end of the carrier uncertainty range and then is decreased by 10 kHz per symbol period until the lower end of the range is reached, and so on, until a signal is acquired.

The post-correlator processing block 120 monitors the correlation outputs at the end of each symbol period and generates a trip signal if any of the correlation outputs is sufficiently high. The processing block 120 does not generate a trip signal unless one of the correlation outputs, normalized to the output of the power estimator block 108, exceeds a predetermined threshold. This threshold depends upon the characteristics of the network in which the receiver 52 is used, and factors such as the minimum detectable signal level and the false trip rate may be taken into account.

When the correlator control logic block 122 receives a trip signal, it commands one of the four auxiliary correlators 118 to qualify the trip while the primary correlators 114 continue searching. The control logic 122 sets the assigned auxiliary correlator to the frequency at which the trip occurred and instructs the PN sequence generator to provide the auxiliary correlator 118 with a copy of the PN sequence at the search phase associated with the trip. To qualify the trip, the auxiliary correlator correlates the incoming digital signal against the PN sequence at the selected search phase over successive symbol periods. The correlation over a given symbol period is a "success" if the correlation output of the auxiliary correlator 118, normalized to the output of the power estimator block 108, exceeds a predetermined threshold. The trip is qualified after three consecutive successful symbol periods. On the other hand, the auxiliary correlator 118 drops the trip and ends qualification after three consecutive unsuccessful correlating periods or after twelve symbol periods have passed without qualification. If no auxiliary correlators 118 are available when a trip signal occurs (i.e., if all four auxiliary correlators 118 are busy qualifying trips), the receiver queues the trip. When a trip signal is qualified, the primary correlators 114 stop searching and the receiver 52 enters the acquisition mode.

The acquisition mode consists of two phases: fine code search and fine frequency search. During fine code search, the receiver 52 sets each primary correlator 114 to the approximate frequency of the qualified trip and sets each of the first sixteen primary correlators 114 to sixteen consecutive phases of the PN sequence separated by one sample. The eighth correlator correlates against the search phase of the qualified trip; the seven preceding correlators correlate against the seven phases, each separated by one sample, immediately preceding the search phase of the qualified trip; and the eight following correlators correlate against the eight phases, each separated by one sample, immediately following the search phase of the qualified trip. The sixteen correlators collect data for one symbol period, with each correlator's correlating period offset a sample behind the correlating period of the preceding correlator.

The outputs of the sixteen correlators undergo a special fine code correlation against an ideal relationship between code phase error and correlator response. This special correlation indicates which offset from the code phase of the qualified trip most closely correlates to the ideal response, which is considered over a range of ±4 samples from perfect code alignment. A normalized ideal response (R) at each sample offset is represented by the following equation:

$$R_i = (1 - 64i/504)^2,$$

where i is the offset in samples and $-4 \leq i \leq 4$. The correlation (C) of each sample offset against the ideal response then is determined by the following equation:

$$C_j = \Sigma R_i \cdot O_{i+j+7},$$

where $O_k$ is the output of the $k^{th}$ correlator ($0 \leq k < 16$), and where i and j represent the offset in samples ($-4 \leq i, j \leq 4$). For j=−4 and i=−4, "i+j" is less than zero, so the special correlation value at these offset values is disregarded. The best-fit code phase is the one for which the corresponding correlation value ($C_j$) is largest ("code phase zero" or "data phase zero"). The receiver 52 continues to qualify any outstanding search trips during fine code search but terminates trip qualification when the fine code search stage is successful.

In the fine frequency search phase, which begins after the fine code search is successful, the four auxiliary correlators 118 are used to find the peak of the frequency response to the incoming signal. Each of the auxiliary correlators 118 is set to code phase zero, as determined in the fine code search phase, and to one of several frequencies near the frequency of the qualified trip. Each auxiliary correlator 118 then provides an output representing a point on a frequency response curve, the peak of which represents the signal frequency and may be calculated by the processor.

Figure 10:
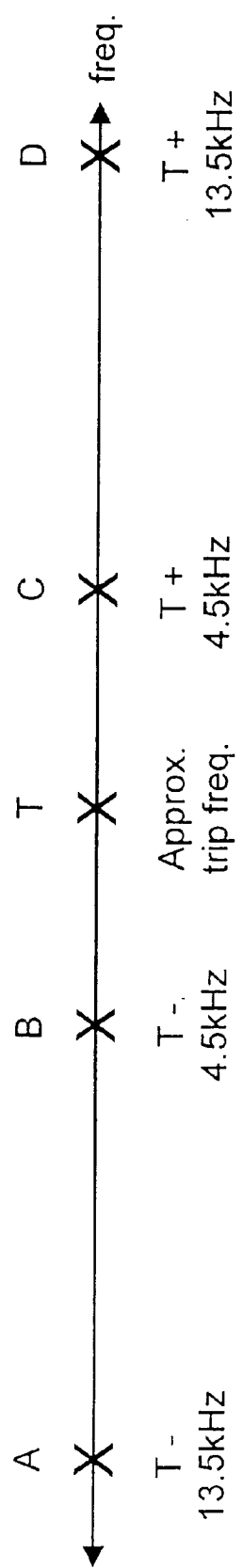
FIG. 10 illustrates the frequency settings of four correlators used to perform a fine frequency search.

Referring also to FIG. 10, the processor, in the fine frequency search phase, uses the four auxiliary correlators to find the peak of the receiver's frequency response to the incoming signal. It does so by tuning each auxiliary correlator to one of four different frequencies, measuring the outputs from each correlator over several correlation periods, and using the measured outputs to calculate the actual frequency of the incoming signal. The four selected frequencies, A, B, C and D, should be evenly spaced over a frequency range centered at the approximate trip frequency (T), i.e., the frequency at which the primary correlators were set when the trip occurred. For example, the lowest frequency (A) and the highest frequency (D) may be 13.5 kHz below and above the approximate trip frequency, while the lower-middle frequency (B) and the higher-middle frequency (C) may be 4.5 kHz below and above the approximate trip frequency. In this arrangement, the fine frequency search covers a 27 kHz frequency band centered on the approximate trip frequency, with the four auxiliary correlators serving as three evenly-spaced frequency discriminator pairs (A-B, B-C, C-D), each covering a 9 kHz interval.

Figure 11:
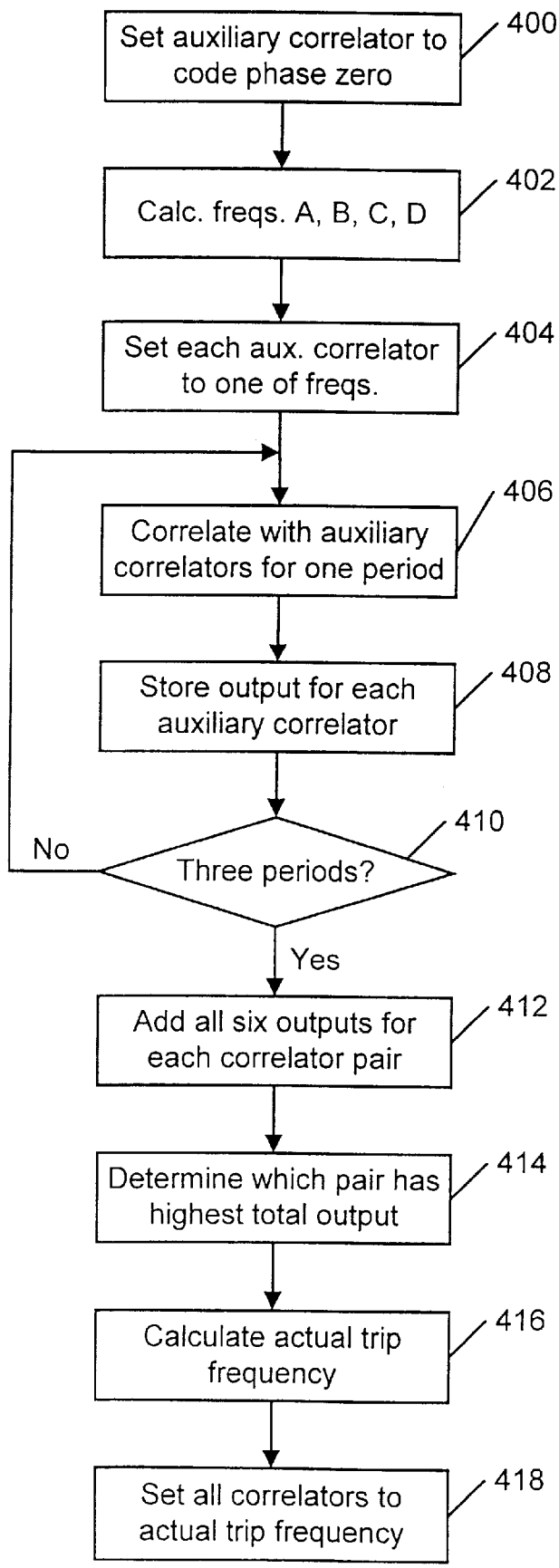
FIG. 11 is a flow chart of the steps performed during a fine frequency search.

Referring also to FIG. 11, the processor begins the fine frequency search phase by setting each auxiliary correlator to code phase zero, as determined during the fine code search phase (step 400). The processor determines the four search frequencies A, B, C and D positioned at T±4.5 kHz and T±13.5 kHz (step 402) and sets each of the auxiliary correlators to one of these frequencies (step 404). Each of the auxiliary correlators then begins correlating the PN sequence against the incoming signal at the correlator's assigned frequency, while the processor reads and stores the correlation outputs for each of three consecutive correlation periods (steps 406, 408, 410). The processor stores twelve correlation outputs, three from each auxiliary correlator.

The processor then adds the values of the six correlation outputs associated with each pair of adjacent correlators, i.e., correlators set to adjacent search frequencies (step 412). In other words, the processor adds the outputs associated with the correlator pair (A-B) searching at T−13.5 kHz and T−4.5 kHz; it adds the outputs associated with the correlator pair (B-C) searching at T−4.5 kHz and T+4.5 kHz; and it adds the outputs of the correlator pair (C-D) searching at T+4.5 kHz and T+13.5 kHz. The processor then determines which correlator pair produces the highest total output (step 414). The actual frequency of the incoming signal lies within the 9 kHz interval defined by the chosen correlator pair.

After selecting the pair of correlators that produces the highest total output, the processor calculates the actual trip frequency (step 416). It does so by defining three variables, X1, X2 and X3, which assume the values of the three correlation outputs associated with the lower end of the chosen 9 kHz interval, and by defining three additional variables, Y1, Y2 and Y3, which assume the values of the correlation outputs associated with the upper end of the interval. The processor then calculates the following sum S:

$$S=\Sigma[(Y_i-X_i)/(Y_i+X_i)],$$

where i=1, 2 and 3. The amount by which the actual frequency of the incoming signal is offset from the center of the 9 kHz interval is determined by the operation K·S, where K is a constant that depends upon the data symbol rate and the frequency spacing of the auxiliary correlators. For a data symbol rate of approximately 19.2 kHz and a frequency spacing of approximately 9 kHz, K will have a value of approximately 4 kHz. The processor determines the frequency offset O of the incoming signal with respect to the approximate trip frequency by solving the following equation:

$$O=K\cdot S+(I-2)\cdot 9 \text{ kHz},$$

where I=1 when the processor chooses the lower 9 kHz frequency interval (A-B); I=2 when the processor chooses the middle 9 kHz interval (B-C); and I=3 when the processor chooses the upper 9 kHz interval (C-D). The actual frequency f of the incoming signal is given by the equation:

$$f=T+O,$$

where T is the trip frequency. The processor then sets all of the primary correlators to the incoming signal's actual frequency f in preparation for the demodulation mode (step 418).

Referring again to FIG. 6, the receiver 52 also incorporates false peak rejection to ensure that it does not lose valid data packets after detecting and qualifying "false" peaks that may occur at code phases and/or frequencies other than the actual phases and frequencies of the true signals. The processor will recognize a false peak when the signal-to-noise ratio (SNR) of the tripping signal does not improve beyond a preset threshold by the end of the acquisition phase. The SNR is determined by dividing the magnitude output of a correlator aligned to the signal by the mean value of the square of the incoming signal samples. The latter is an estimate of the total input power, including both signal and uncorrelated noise. The mean is generated, for example, by a decaying average of squared samples where the time constant of the decaying average is about one-half of the duration of a data symbol. When a false correlation peak occurs, the estimate of total power will include the true signal. In such a case, no matter how well the acquisition process aligns the correlator to the false peak, the SNR can never improve beyond a certain point. To reject false peaks and to avoid subsequent trips on false peaks from the same signal, the processor drops any signal for which the SNR is below the preset threshold after the fine code and frequency search phases, and it sets the trip threshold 6 dB higher than normal during the subsequent search process. Increasing the threshold in this manner allows the receiver 52 to detect the true peak of a strong signal while ignoring nearly all false peaks. The best choice of a preset SNR threshold for false peak rejection depends on the process gain of the system. A preset SNR threshold of −13 dB is suitable in a system that uses a 63-chip PN sequence.

When the fine code and fine frequency search phases are complete, the receiver 52 begins watching for the sync word. Because the sync word is encoded with 2-CCSK modulation, as described above, the correlator control logic 122 assigns only two primary correlators 114 to monitor the incoming signal for the sync word. The two assigned correlators are the correlator associated with code phase zero, as determined in the fine code search phase, and the correlator immediately following it. The two correlators then correlate the incoming signal against the corresponding code phase over the same correlation period. The correlation outputs of the two correlators are provided to the processor, which assigns each symbol in the sync word a soft value $S_i$ according to the equation:

$$S_i=(A_i-B_i)/(A_i+B_i),$$

where $A_i$ and $B_i$ represent the correlation outputs of the two correlators at each symbol period. The processor stores up to thirteen soft values and, after each symbol period, forms a correlation sum (C) according to the equation:

$$C=\Sigma S_i \beta_i,$$

where the sum runs from i=0 to 12 and where $\beta_i$ represents the actual value of the $i^{th}$ bit of the sync word, with logic levels of ±1. The signal is declared synchronized when the correlation sum is greater than some predetermined threshold.

During the demodulation mode, sixteen of the primary correlators 114 correlate the incoming digital signal to the sixteen different code phases defining the 16-CCSK symbol alphabet, with the first correlator corresponding to code phase zero, as determined during the fine code search phase, and the following correlators successively corresponding to the other fifteen code phases. All sixteen correlators use the same correlation period in the demodulation mode. At the end of each symbol period, the post-correlator processor block 120 determines which correlators have the highest correlation outputs. The processor assigns a symbol value to the symbol period based on which correlator produces the highest correlation output. The processor may be programmed so that it does not assign a symbol value (i.e., it issues an "erasure") if the ratio of the highest correlation output to the second highest correlation output does not exceed some predetermined threshold.

During demodulation, the receiver also tracks the code phase of the incoming signal. Code phase tracking ensures that the receiver does not lose alignment with the signal as a result of clock drift that may affect the output of the PN sequence generator 116. To track the code phase, the correlator control logic 122 assigns thirty-two additional primary correlators 114, half of which provide "early" correlation values and the other half of which provide "late" correlation values. Each "early" correlator is set to a code phase that is between one and four samples ahead of the code phase associated with one of the main demodulation correlators ("on-phase" correlators) discussed above. Each "late" correlator is set to a code phase that is between one and four samples behind the code phase associated with one of the on-phase correlators. The receiver 52 uses the correlation outputs of the early and late correlators associated with the on-phase correlator aligning to the incoming signal during each symbol period to calculate a code phase error (R), according to the equation:

$$R=(E-L)/O$$

where E and L are the outputs of the early and late correlators and O is the output of the on-phase correlator. The code phase error may be used to update the clocking rate of the PN sequence generator 116 when the error is, e.g., greater than $\frac{1}{16}$ chip.

Figure 7A:
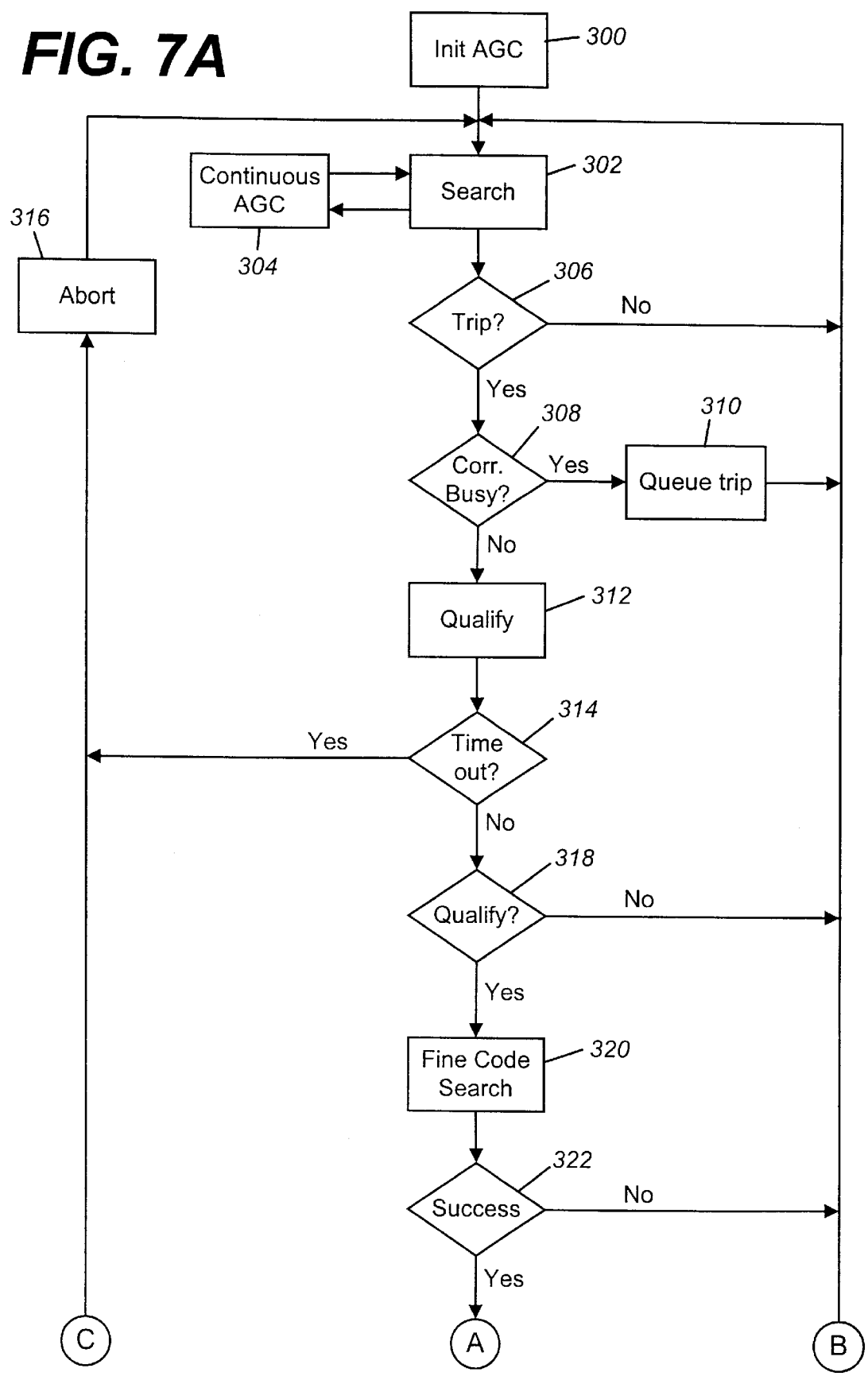
FIGS. 7A and 7B are flow diagrams of the operation of the receiver of FIG. 6 during search, acquisition, and demodulation of spread spectrum signals.
Figure 7B:
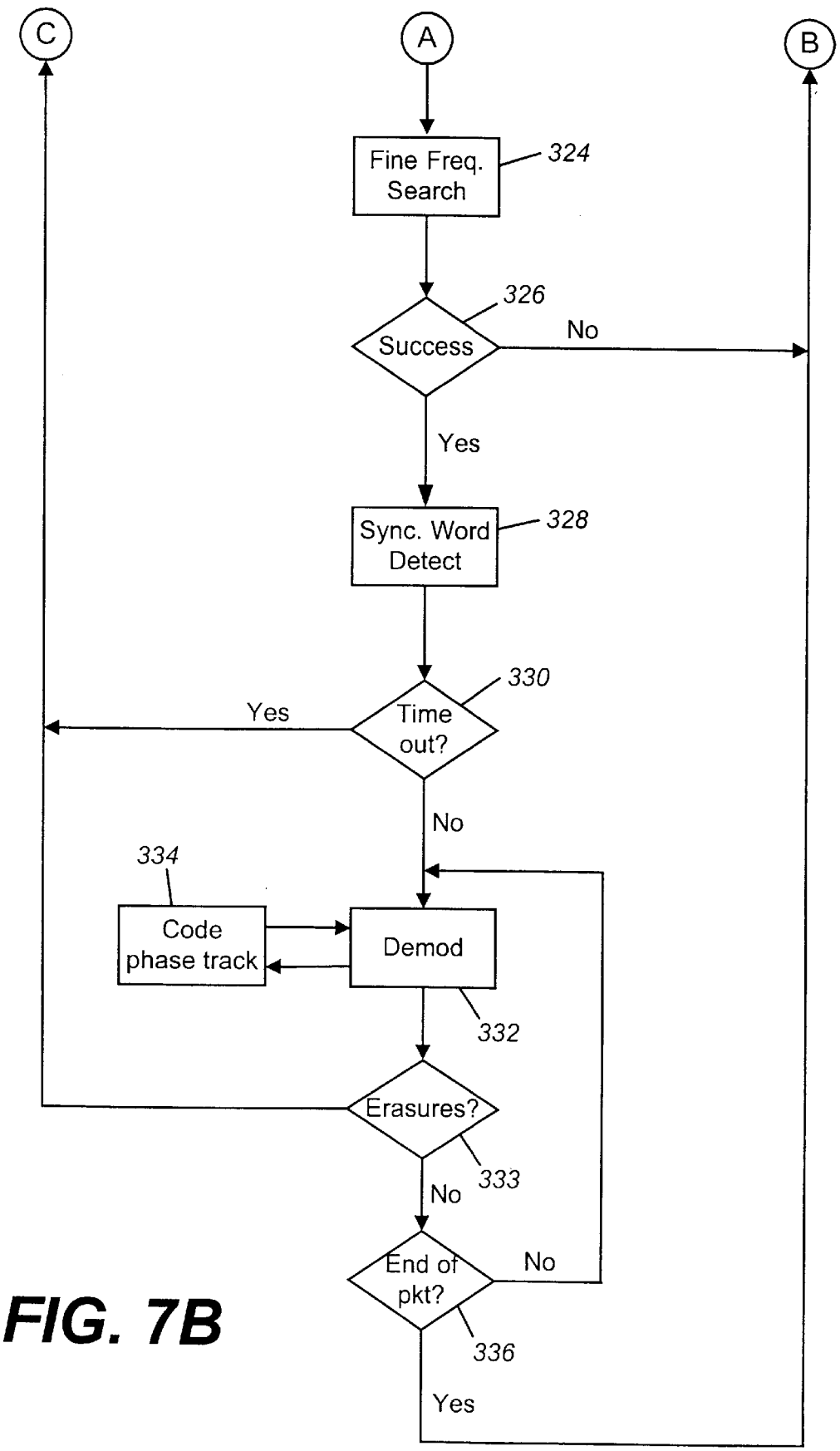

Referring also to FIGS. 7A and 7B, the receiver begins operation upon startup by initializing the automatic gain control circuit (step 300). The receiver then enters the search mode (step 302) and continuously searches for a DSSS signal, constantly monitoring and adjusting the AGC circuit (step 304), until a trip signal occurs (step 306). When a trip signal occurs, the receiver determines whether all of the auxiliary correlators are busy (step 308). If so, the receiver queues the trip signal (step 310) and continues searching (step 302); otherwise, the receiver assigns an auxiliary correlator to qualify the trip (step 312). The receiver then monitors the qualification process to determine whether the trip signal is qualified or rejected within the allotted period of time (steps 314 and 318). If neither qualification nor rejection occurs within twelve symbol periods, the receiver aborts the qualification process for that trip signal (step 316) and continues searching for DSSS signals (step 302). The receiver also continues searching if the trip signal is disqualified (step 318). If, on the other hand, the auxiliary correlator qualifies the trip signal, the receiver enters the acquisition mode.

In the acquisition mode, the receiver first assigns several primary correlators to carry out the fine code search (step 320). The receiver then monitors the assigned correlators to determine whether the code phase is successfully acquired (step 322). If not, the receiver returns to the search mode and resumes its search for DSSS signals (step 302); otherwise, the receiver instructs the auxiliary correlators to enter the fine frequency search phase (step 324). The receiver then monitors the four general correlators to determine whether the fine frequency search leads to successful acquisition of the frequency offset (step 326). If not, the receiver returns to the search mode and resumes searching (step 302); otherwise, the receiver prepares for sync word detection (step 328). If the expected sync word is not detected within the appropriate time limit, the sync word detection process times out (step 330) and is aborted (step 316), and the receiver again begins searching for DSSS signals (step 302). If the sync word is detected, the receiver enters the demodulation mode (step 332). In the demodulation mode, the receiver continuously tracks the code phase of the incoming data signal to prevent drift in alignment (step 334). If too many erasures occur during demodulation (step 333), the demodulation process is aborted (step 316) and the receiver again searches for DSSS signals (step 302). Otherwise, the receiver continues to demodulate data until the end of the transmitted packet (step 336). When the end of the packet is reached, the receiver leaves the demodulation mode, reenters the search mode, and again begins searching for DSSS signals (step 302).

Figure 8A:
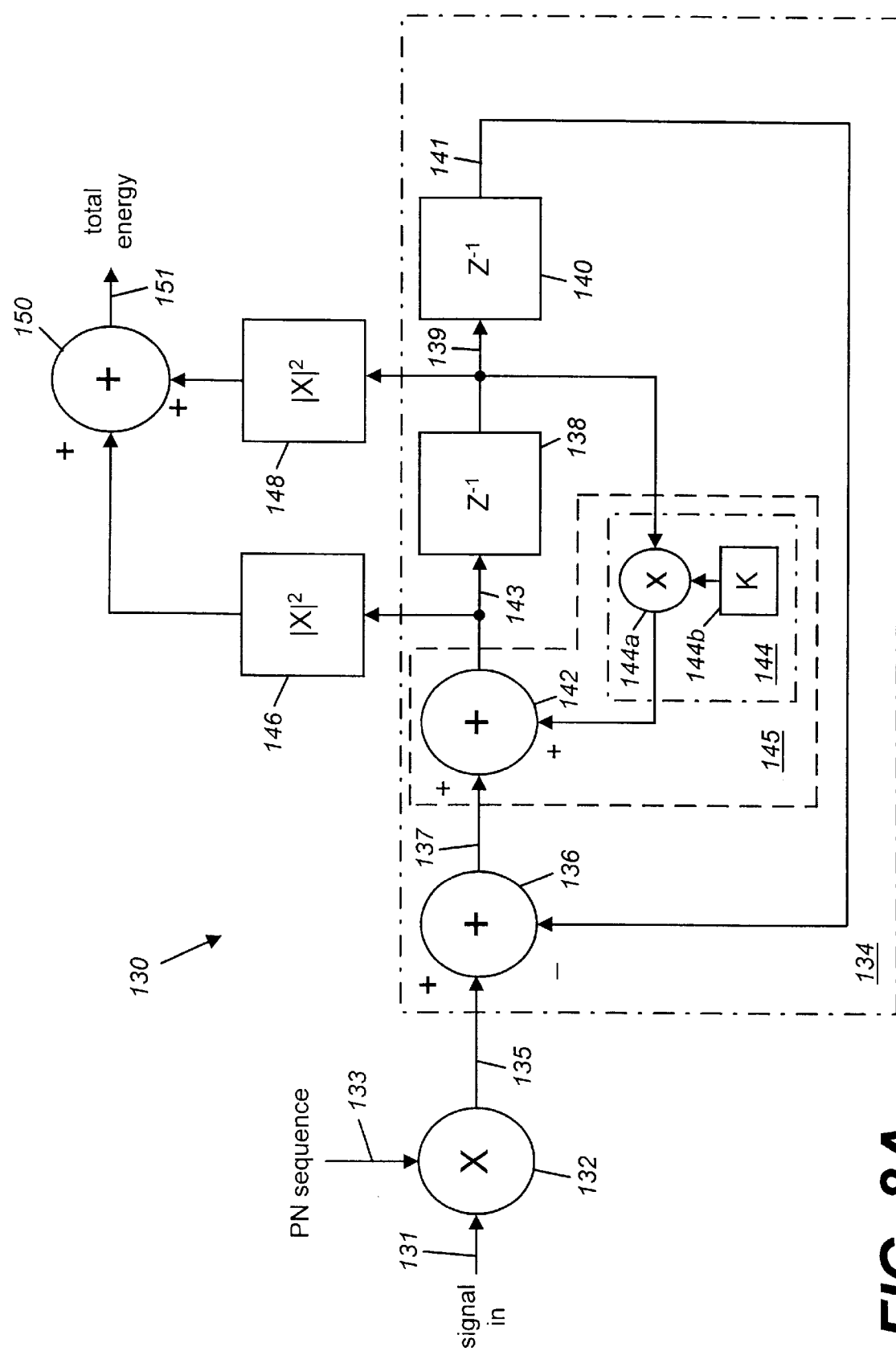
FIGS. 8A and 8B are block diagrams of implementation efficient correlators for use in recovering data from spread spectrum signals.

Referring now to FIG. 8A, each bandpass correlator (primary and auxiliary) in the receiver may utilize an implementation efficient (IE) correlator structure 130. As discussed above, the incoming digital signal 131 should enter the correlator at a carrier frequency equal to approximately one-quarter the digital sampling rate ($F_s/4$). The IE correlator structure provides approximate quadrature processing and frequency adjustment in a unified block that requires few and inexpensive components. The structure includes a digital multiplier 132 followed by an accumulation loop 134 having a primary summer 136 and two delay elements 138 and 140, both of which may be single sample delay registers. The output 141 of the second delay register 140 feeds back to the primary summer 136 and is subtracted from the product output 135 of the multiplier 132. The output 139 of the first delay register 138 feeds directly into the second delay register 140. Output 139 also may be provided to a frequency adjustment element 145 that allows the processor to adjust the resonant frequency of the accumulation loop 134. Within the frequency adjustment element 145, the output 139 of the first delay register 138 is scaled by a scaling element 144, fed back to a secondary summer 142, and added to the output 137 of the primary summer 136. The correlator structure 130 may be implemented in standard, off-the-shelf components, but it is particularly suited for implementation in an application specific integrated circuit (ASIC).

In operation, the incoming digital signal 131 and a local copy of the PN sequence 133 are provided as inputs to the multiplier 132. If the two are in code phase alignment, the code product always equals "1" and the output 135 of the multiplier is simply the $F_s/4$ carrier wave. Because the loop delay is two samples, the output 141 of the second delay register 140 is approximately 180° out-of-phase with the multiplier output 135 and therefore reinforces the multiplier output 135 in the primary summer 136 during the subtraction operation. The input 143 and the output 139 of the first delay register 138 differ by one sample time and therefore are approximately 90° out-of-phase, so they may be taken as the in-phase and quadrature components, respectively, of the $F_s/4$ carrier wave. At the end of the accumulation time (one correlation period), the in-phase and quadrature outputs are taken and the delay registers 138 and 140 both are set to zero to re-initialize the accumulation loop 134. The final output 151 is the sum of the squares of the in-phase and quadrature components at the end of each correlation period, as provided by squaring circuits 146 and 148 and adder 150.

The register 140 may delay output 139 by multiple samples, instead of a single-sample, so that the phase offset between output 135 and output 141 is a multiple of 180°. For example, a three sample delay in the register 140 leaves output 141 360° out-of-phase with product output 135. In this case, the primary summer 136 will add output 141 to product output 135 to form an accumulation output.

The frequency adjustment element 145 includes a scaling element 144, the scaling factor (K) of which is variable to allow for frequency adjustment within the correlator's accumulation loop 134. The scaling factor K has a value equal to $2 \cdot \cos(\Omega_0)$, where $\Omega_0$ represents $2\pi$ times the ratio of the desired resonant frequency of the accumulation loop 134 to the sampling rate ($F_s$) of the A/D converter 104 (the absolute value of K typically will be much less than one). The value of the scaling factor may be selected by the processor and stored in a programmable storage element 144b such as a register. A multiplication element 144a applies the scaling factor to the output 139 of the first delay register 138, and the resulting signal is added by the secondary summer 142 to the output 137 of the primary summer 136. When the scaling factor has a value of zero, the secondary summer 142 has no effect on the correlator structure. However, when the scaling factor is slightly above or below zero, the effective delay in the accumulation loop 134 is slightly greater than or less than two samples, so the loop response is centered at a frequency slightly below or slightly above $F_s/4$. Since the delay between the output 139 of delay element 138 and the output 141 of delay element 140 always remains at one sample, adjusting the scaling factor to a value other than zero introduces a small quadrature error at frequencies offset from $F_s/4$. At small frequency offsets, the quadrature error is insignificant.

Figure 8B:
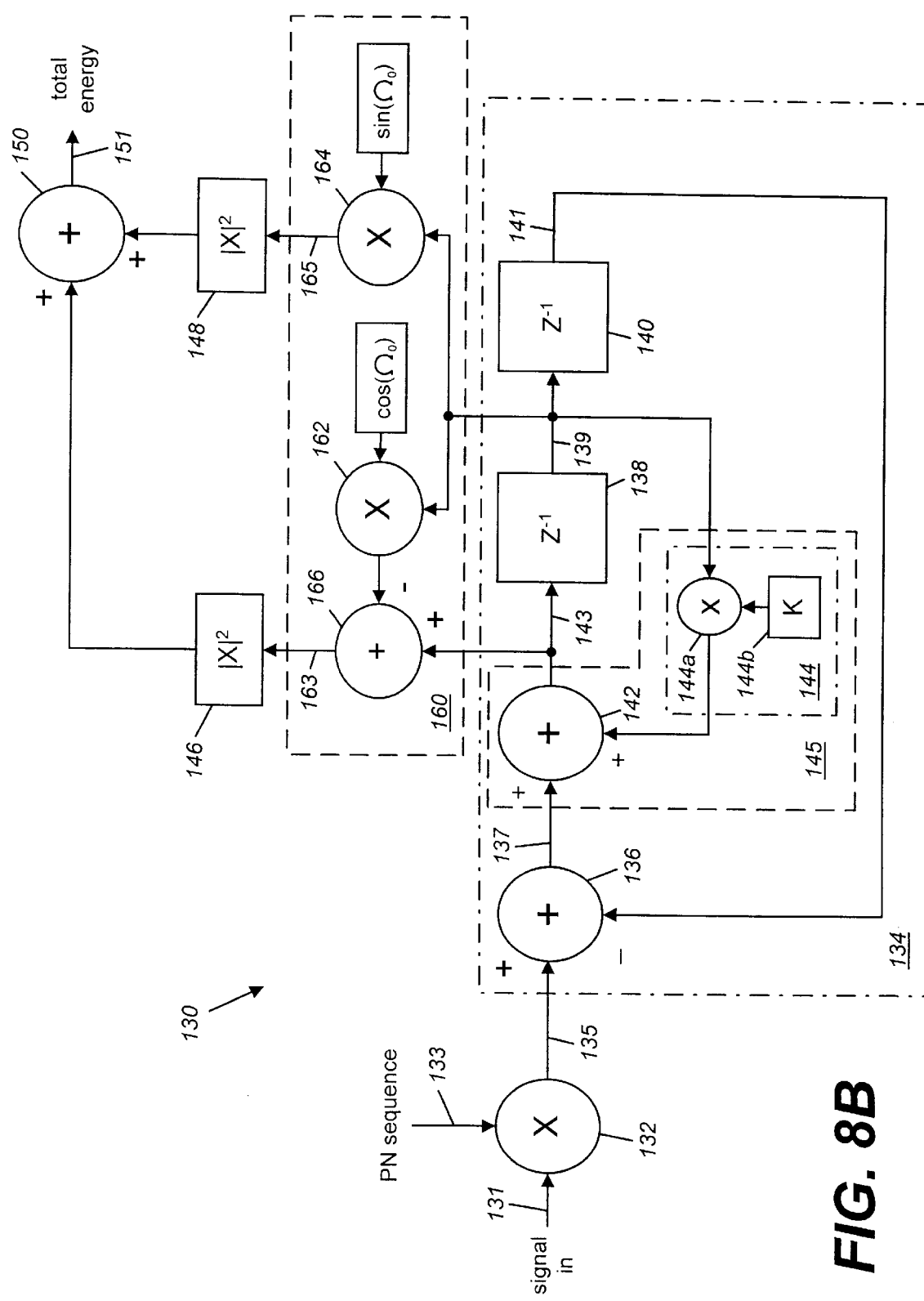

Referring to FIG. 8B, a quadrature error correction element 160 may be added to the correlator structure 130 to eliminate the quadrature error introduced by the scaling element 144. The correction element 160 includes two multiplication elements 162 and 164, which multiply the output 139 of the accumulation loop 134 with signals equal to $\cos(\Omega_0)$ and $\sin(\Omega_0)$. The output 165 of multiplication element 164 represents the corrected quadrature component of the accumulation output and is provided to squaring circuit 148. Summer 166 produces the corrected in-phase component of the accumulation output by subtracting the output 163 of multiplication element 162 from the output 143 of secondary summer 142. The corrected in-phase component is provided to squaring circuit 146.

Figure 9:
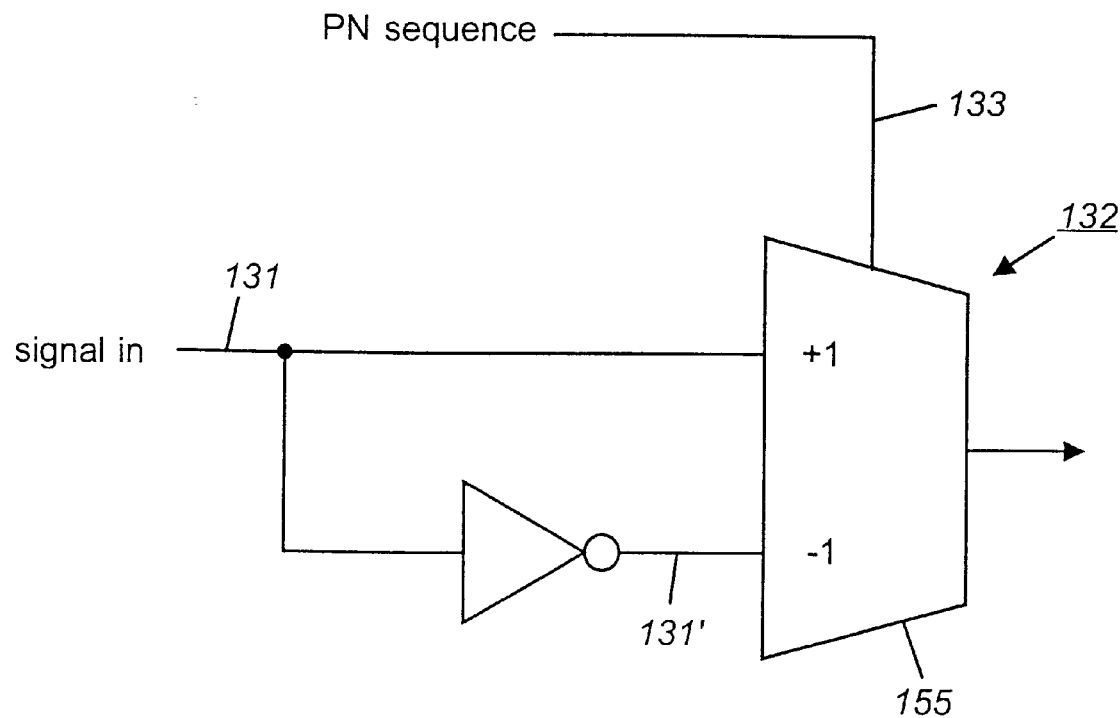
FIG. 9 is a schematic diagram of a sign inverter for use in the correlator of FIG. 8 in recovering data modulated onto direct sequence spread spectrum signals using cyclic code shift keying (CCSK) modulation.

Referring also to FIG. 9, when a binary PN sequence serves as the spreading signal, the digital multiplier 132 may be a simple sign inverter realized, e.g., as a digital multiplexer 155 receiving the incoming digital signal 131 and an inverted version 131' of this signal as inputs and having a local copy of the PN sequence 133 as its control signal. The non-inverted signal 131 is selected by the multiplexer 155 when the PN sequence 133 is high, and the inverted signal 131' is selected when the PN sequence 133 is low. When the incoming signal 131 and the PN sequence 133 are aligned, the PN sequence cancels the spreading signal from the incoming signal 131 and only the $F_s/4$ carrier wave exits the multiplexer 155.

The invention may be implemented in digital electronic circuitry or in computer hardware, firmware, software, or in combinations of them. For example, the invention may be implemented, at least in part, as a program tangibly embodied in a machine-readable storage device for execution by a microprocessor. Method steps according to the invention may be performed by a processor executing instructions organized, e.g., into program modules to operate on input data and to generate output. Suitable processors include, e.g., both general and special purpose microprocessors, which generally receive instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM disks. Any of these technologies may be supplemented by, or incorporated in, specially-designed ASICs (application-specific integrated circuits).

Other embodiments are within the scope of the following claims. For example, while the invention has been described in terms of three frequency discrimination pairs, a greater or lesser number of discriminator pairs may be used.

What is claimed is:

1. A method for use in determining an actual carrier frequency of a spread spectrum signal, the method comprising:

tuning a pair of correlators to a pair of search frequencies;

correlating the spread spectrum signal against a reference signal in each of the correlators to produce a pair of correlation magnitude values;

determining a ratio of a difference between the correlation magnitude values to a sum of the correlation magnitude values to produce a frequency offset; and determining the actual carrier frequency by using the frequency offset and an estimated carrier frequency.

2. The method of claim 1, wherein one of the search frequencies is greater than the estimated carrier frequency and the other search frequency is less than the estimated carrier frequency.

3. The method of claim 1, wherein both of the search frequencies are greater than the estimated carrier frequency.

4. The method of claim 1, wherein both of the search frequencies are less than the estimated carrier frequency.

5. The method of claim 1, wherein the spread spectrum signal is correlated against the reference signal by each of the correlators over multiple correlation periods to produce multiple correlation magnitude values for each correlator.

6. The method of claim 5, further comprising calculating, for each correlation period, the difference and the sum of correlation magnitude values for the pair of correlators.

7. The method of claim 5, wherein the ratio of the difference to the sum of the correlation magnitude values is calculated for the pair of correlators during each correlation period.

8. The method of claim 7, further comprising summing the ratios of all of the correlation periods.

9. The method of claim 1, further comprising tuning at least one additional correlator to another search frequency and correlating the spread spectrum signal against the reference signal to produce at least one additional correlation magnitude value.

10. The method of claim 9, wherein the search frequencies are evenly spaced.

11. The method of claim 9, wherein the ratio is determined using the difference and the sum of correlation magnitude values for a chosen pair of the correlators tuned to adjacent search frequencies.

12. The method of claim 11, wherein the offset is proportional to the ratio and includes a constant determined by which pair of the correlators is chosen.

13. The method of claim 11, further comprising calculating a cumulative total of correlation magnitude values for each pair of correlators tuned to adjacent search frequencies.

14. The method of claim 13, wherein the chosen pair of correlators includes the correlators that produce the highest cumulative total of correlation magnitude values.

15. The method of claim 9, wherein the estimated carrier frequency is equidistant from the highest and lowest search frequencies.

16. An apparatus for use in determining an actual carrier frequency of a spread spectrum, the apparatus comprising:
a pair of correlators tunable to a pair of search frequencies and adapted to correlate the spread spectrum signal against a reference signal to produce a pair of correlation magnitude values; and
processing circuitry adapted to determine a frequency offset by using a ratio of a difference between the correlation magnitude values to a sum of the correlation magnitude values and determine the actual carrier frequency by using the frequency offset and an estimated carrier frequency.

17. The apparatus of claim 16, wherein one of the search frequencies is greater than the estimated carrier frequency and the other search frequency is less than the estimated carrier frequency.

18. The apparatus of claim 16, wherein both of the search frequencies are greater than the estimated carrier frequency.

19. The apparatus of claim 16, wherein both of the search frequencies are less than the estimated carrier frequency.

20. The apparatus of claim 16, wherein each correlator correlates the spread spectrum signal against the reference signal over multiple correlation periods to produce multiple correlation magnitude values for each correlator.

21. The apparatus of claim 20, wherein the processing circuitry is configured to calculate, for each correlation period, the difference and the sum of correlation magnitude values for the pair of correlators.

22. The apparatus of claim 20, wherein the processing circuitry is configured to calculate the ratio of the difference to the sum of the correlation magnitude values for the pair of correlators during each correlation.

23. The apparatus of claim 22, wherein the processing circuitry is configured to sum the ratios of all of the correlation periods.

24. The apparatus of claim 16, further comprising at least one additional correlator tunable to another search frequency and adapted to correlate the spread spectrum signal against the reference signal to produce at least one additional correlation magnitude value.

25. The apparatus of claim 24, wherein the search frequencies are evenly spaced.

26. The apparatus of claim 24, wherein the processor is configured to determine the ratio using the difference and the sum of correlation values for a chosen pair of the correlators tuned to adjacent ones of the search frequencies.

27. The apparatus of claim 26, wherein the offset is proportional to the ratio and includes a constant having a value that is determined by which pair of the correlators is chosen.

28. The apparatus of claim 26, wherein the processing circuitry is configured to calculate a cumulative total of the correlation values for each pair of correlators tuned to adjacent ones of the search frequencies.

29. The apparatus of claim 28, wherein the chosen pair of correlators includes the correlators that produce the highest cumulative total.

30. The apparatus of claim 28, wherein the estimated carrier frequency is equidistant from the highest and lowest search frequencies.

31. A method for use in determining an actual carrier frequency of a spread spectrum signal, the method comprising:
tuning a pair of correlators to a pair of search frequencies;
correlating the spread spectrum signal against a reference signal in each of the correlators to produce a pair of correlation magnitude values;
determining a frequency offset expressed as $$K*S+(I-2)\cdot 9 \text{ kHz}$$

where K is a constant, I is 1, 2, or 3, and S is a sum of a plurality of ratios determined at different points in a chosen interval, each ratio determined by dividing a difference between the correlation magnitude values by a sum of the correlation magnitude values; and calculating the actual carrier frequency by summing the frequency offset and an estimated carrier frequency.

32. An apparatus for use in determining an actual carrier frequency of a spread spectrum, the apparatus comprising:
a pair of correlators tunable to a pair of search frequencies and adapted to correlate the spread spectrum signal against a reference signal to produce a pair of correlation magnitude values; and
a processing circuitry adapted to determine the actual carrier frequency by adding a frequency offset to an estimated carrier frequency, said frequency offset expressed as $$K * S+(I-2)\cdot 9 \text{ kHz}$$

where K is a constant, I is 1, 2, or 3, and S is a sum of a plurality of ratios determined at different points in a chosen interval, each ration determined by dividing a difference between the correlation magnitude values by a sum of the correlation magnitude values.

* * * * *

UNITED STATES PATENT AND TRADEMARK OFFICE
CERTIFICATE OF CORRECTION

PATENT NO. : 6,178,197 B1
DATED : January 23, 2001
INVENTOR(S) : Robert K. Froelich and Forrest F. Fulton It is certified that error appears in the above-identified patent and that said Letters Patent is hereby corrected as shown below:

<u>Title page,</u>
Item [63], Related U.S. Application Data, should read -- This application is related to applications Serial No. 08/880,634, filed June 23, 1997, now Pat. No. 6,047,016; Serial No. 08/880,470, filed on June 23, 1997; Serial No. 08/881,549, filed on June 23, 1997, now Pat. No. 6,263,009; Serial No. 08/880,637, filed on June 23, 1997; Serial No. 08/880,578, filed on June 23, 1997. --

Signed and Sealed this

Seventh Day of January, 2003

JAMES E. ROGAN
*Director of the United States Patent and Trademark Office*